US011400596B2

(12) United States Patent
Liivik et al.

(10) Patent No.: US 11,400,596 B2
(45) Date of Patent: Aug. 2, 2022

(54) DEVICE AND METHOD FOR CONSUMABLE ITEM DELIVERY BY A MOBILE ROBOT

(71) Applicant: STARSHIP TECHNOLOGIES OÜ, Tallinn (EE)

(72) Inventors: Märt Liivik, Tallinn (EE); Siim Viilup, Tallinn (EE); Tiit Liivik, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 305 days.

(21) Appl. No.: 16/835,233

(22) Filed: Mar. 30, 2020

(65) Prior Publication Data

US 2020/0316777 A1  Oct. 8, 2020

Related U.S. Application Data

(63) Continuation of application No. PCT/EP2018/076635, filed on Oct. 1, 2018.

(30) Foreign Application Priority Data

Oct. 20, 2017 (EP) .................................... 17194320

(51) Int. Cl.
*B25J 19/04* (2006.01)
*B25J 9/16* (2006.01)
(Continued)

(52) U.S. Cl.
CPC ........... *B25J 9/1679* (2013.01); *B25J 9/0009* (2013.01); *B25J 11/008* (2013.01);
(Continued)

(58) Field of Classification Search
CPC .... G06Q 50/30; G06Q 10/0832; G06Q 50/28; B25J 19/04; B25J 11/008; B25J 9/1679; B25J 19/0054; B25J 19/061; B25J 9/0009; B25J 5/007; G05D 1/0282; G05D 1/0027; G05D 1/0088; G05D 1/0061;
(Continued)

(56) References Cited

U.S. PATENT DOCUMENTS 4,549,841 A   10/1985  Ishige
5,664,928 A    9/1997  Stauber
(Continued)

FOREIGN PATENT DOCUMENTS

WO   WO 2011/035839    3/2011
WO   WO 2017064202    4/2017
(Continued)

OTHER PUBLICATIONS

Wan et al., Air Flow Measurement and Management for Improving Cooling and Energy Efficiency in Raised-Floor Data Centers: A Survey, 2018, IEEE, p. 48867-48901 (Year: 2018).*
(Continued)

*Primary Examiner* — Marc McDieunel
(74) *Attorney, Agent, or Firm* — Siritzky Law, PLLC

(57) ABSTRACT

A mobile robot configured for delivering consumable items to delivery recipients. The mobile robot comprises an item compartment with a top section, a separator, and a bottom section. The mobile robot also comprises a temperature control component. A method for delivering consumable items to delivery recipients using the mobile robot.

20 Claims, 5 Drawing Sheets

(51) Int. Cl.
*B25J 9/00* (2006.01)
*B25J 11/00* (2006.01)
*B25J 19/00* (2006.01)
*B25J 19/06* (2006.01)
*B25J 5/00* (2006.01)

(52) U.S. Cl.
CPC ........... *B25J 19/0054* (2013.01); *B25J 19/04* (2013.01); *B25J 19/061* (2013.01); *B25J 5/007* (2013.01)

(58) Field of Classification Search
CPC .......... G05D 2201/02; G05B 19/41895; Y02P 90/02; Y02P 90/60
See application file for complete search history.

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 6,708,081 | B2 * | 3/2004 | Yoshida .................. B25J 9/161 901/1 |
| 6,889,118 | B2 * | 5/2005 | Murray, IV ............ B25J 9/1666 318/568.13 |
| 7,073,634 | B2 | 7/2006 | Mitchell et al. |
| 7,076,331 | B1 * | 7/2006 | Nagatsuka ............. A63H 11/00 700/258 |
| 7,099,742 | B2 * | 8/2006 | Tajima ................... G06N 3/008 700/250 |
| 7,103,447 | B2 * | 9/2006 | Di Profio ............... G06N 3/008 700/262 |
| 7,113,848 | B2 * | 9/2006 | Hanson .................. G16Z 99/00 700/258 |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Trevino et al. |
| 2015/0183581 | A1 | 7/2015 | Worsley |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0235236 | A1 | 8/2016 | Byers et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267348 | A1 | 9/2017 | Sweeny et al. |
| 2017/0267452 | A1 | 9/2017 | Goren et al. |
| 2018/0020896 | A1 | 1/2018 | High et al. |
| 2018/0068253 | A1 | 3/2018 | Simms et al. |
| 2018/0092484 | A1 | 4/2018 | Lewis et al. |
| 2018/0349834 | A1 | 12/2018 | Heinla et al. |
| 2019/0366558 | A1 * | 12/2019 | Gupta .................. B25J 11/0005 |

FOREIGN PATENT DOCUMENTS

| | | |
|---|---|---|
| WO | WO 2017156586 | 9/2017 |
| WO | WO 2017196759 | 11/2017 |
| WO | WO 2018118010 | 6/2018 |
| WO | WO 2018134209 | 7/2018 |
| WO | WO 2018191504 | 10/2018 |

OTHER PUBLICATIONS

Navarro et al., User Centered Design of an Autonomous Mobile Robot Vending Machine Concept, 2016, IEEE, p. 259-264 (Year: 2016).*
Carreira et al., i-Merc: A Mobile Robot to Deliver Meals inside Health Services, 2006, IEEE, p. 1-8 (Year: 2006).*
Zhou et al., A tele-operative RMMT system facilitating the management of cooling and energy in data centers, 2011, IEEE, p. 822-827 (Year: 2011).*
Tan et al., A new Automated Food Delivery System using autonomous track guided centre-wheel drive robot, 2011, IEEE, p. 32-36 (Year: 2011).*
Neal et al., A behaviour-based approach to robotic grasp formulation: experimental evaluation in a food product handling application, 2002, IEEE, p. 304-309 (Year: 2002).*
Tan et al., Automated Food Ordering System with Interactive User Interface approach, 2010, IEEE, p. 482-485 (Year: 2010).*
Hasegawa et al., A stereo vision system for position measurement and recognition in an autonomous robotic system for carrying food trays, 1999, IEEE, p. 661-668 (Year: 1999).*
Baker: "Automated Street Crossing for Assistive Robots" Proceedings of the 2005 IEEE, Jun. 28-Jul. 1, 2005, http://citeseerx.ist.psu.edu/viewdoc/download?doi=10.1.1.124.2156&rep=rep1&type=pdf.
Jeniece Pettitt: "Forget-delivery-drones-meet-your-new-delivery-robot", Nov. 2, 2015, Retrieved from the Internet: URL: https ://www.cnbc.com/2015/11/02/forget-delivery-drones-meet-your-new-delivery-robot.html.
Anonymous: "Lieferroboter Starship: "Klauen würde ich ihn nicht"—Auto-Tagesspiegel", Nov. 29, 2015, Retrieved from the Internet: URL: http://www.tagesspiegel.de/mobil/lieferroboter-starship-klauen-wuerde-ich-ihn-nicht/12647114.html.
WIPO, (Ib/373) International Preliminary Report on Patentability Chapter I for PCT/EP2018/076635, dated Aug. 4, 2020.
WIPO, (ISA/210) International Search Report for PCT/EP2018/076635, dated Nov. 4, 2019.
WIPO, (ISA/237) Written Opinion of the International Searching Authority for PCT/EP2018/076635, dated Nov. 4, 2019.

* cited by examiner

DEVICE AND METHOD FOR CONSUMABLE ITEM DELIVERY BY A MOBILE ROBOT

RELATED APPLICATIONS

This application is a continuation of PCT/EP2018/076635, filed Oct. 1, 2018, published as WO 2019/068634A1, which claims priority to European (EP) patent application no. 17194320.2 filed Oct. 2, 2017, the entire contents of both of which are hereby fully incorporated herein by reference for all purposes.

FIELD

The invention relates to robots delivering consumable items to customers. More specifically, the invention relates to a robot configured to deliver food and beverages to customers.

INTRODUCTION

Automation and robotics are increasingly changing many industries. Recently, the use of mobile robots for delivery purposes is on the rise. Small robots with various degrees of autonomy can be used on sidewalks to carry various items to their recipients and perform "last-mile" deliveries. The robots can comprise an item space or compartments for storing items during delivery.

A large component of the delivery industry is food and beverage delivery. Customers often prefer to order their meals to be delivered to their home or work instead of getting them themselves or going out to eat. Particularly, pizza is often ordered as a meal or a snack to share. Mobile robots can also be used for food deliveries from supermarkets, restaurants, cafes and other food providers to the customers. It can be convenient to have the robot's item space have multiple compartments or a divider to carry items of different temperature together, such as hot meals and cold drinks.

US patent application 2015/0006005 A1 discloses autonomous unmanned road vehicles that can have heated or cooled compartments. The vehicles are configured to be driven on public roads.

U.S. Pat. No. 9,373,149 discloses an autonomous neighborhood vehicle that can comprise compartments with individually controlled temperature and humidity levels (see description to FIG. 44 of U.S. Pat. No. 9,373,149). Such compartments are briefly mentioned in the application.

SUMMARY

In light of the above, it is the object of the present invention to disclose a device and method of delivering consumable items to customers. It is also the object of the present invention to disclose a mobile robot comprising compartments that are configured to receive consumable items of different temperatures. It is further the object of the present invention to disclose an item compartment particularly optimized to receive, on the one hand, heated consumable items such as pizzas and, on the other hand, cooled or temperature neutral items such as beverages, salads and side dishes.

In a first embodiment, the invention discloses a mobile robot configured for delivering consumable items to delivery recipients. The mobile robot comprises a body comprising an item compartment. The item compartment comprises a top section configured to hold at least one heated consumable item. The item compartment also comprises a bottom section configured to hold at least one of at least one cooled consumable item and at least one temperature neutral consumable item. The item compartment further comprises a separator configured to separate the top section and the bottom section. The item compartment also comprises at least one temperature control component configured to maintain at least one of a temperature exceeding ambient temperature in the top section and a temperature below that of the top section in the bottom section.

The mobile robot can be configured to operate in unstructured environments, such as outdoor environments. The robot can be configured to travel on pedestrian walkways such as sidewalks. The mobile robot can be an autonomous or a semi-autonomous robot configured for ground-based travel. Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

In other words, the mobile robot can have a compartment that is particularly configured for carrying both hot and warm consumable items in an optimal way and so as to minimize heat exchange between them. The configuration of the item compartment can be particularly advantageous, as placing hot items in the top part ensures that the warm air rising off them does not contribute to the warming of cold items placed below, and vice versa. The separator can further contribute to the separation between the "hot" and "cold" parts of the compartments by presenting a further physical delimitation between the two.

The temperature maintained in the top section can comprise a temperature of at least 30° C., preferably at least 40° C. This can be an overall average temperature inside the section and/or the maximum temperature inside the section. The temperature inside the top section can be close to the temperature of the heated item and/or it can be below that, but high enough to ensure that it does not lose too much heat on the way to the delivery recipient.

The temperature in the bottom section can be above or below that of the ambient surroundings depending on the weather, season, and/or location. However, the temperature of the bottom section is preferably always below the temperature of the top section. For example, the temperature of the bottom section can be below 20° C.

In some embodiments, the separator can comprise the temperature control component. That is, the temperature control component can be inbuilt into the separator, or be fashioned in such a way so as to serve as both the separator and the temperature control component. This can be particularly advantageous, since the two sides of the separator can be used to integrate a heating and a cooling element respectively. The separator can also only have a heating element integrated, since placing it at the bottom of the top section would ensure that the heat it generates rises and efficiently surrounds the heated consumable item. The cooling element can then be placed at the bottom section of the item compartment, or in side pockets on its walls.

In some embodiments, the separator can comprise a heat reflective material. This can serve to decrease radiative heat transfer between the top and bottom sections.

In some embodiments, at least part of the separator is transparent. That is, the separator or at least part of it can comprise a glass or a plastic material. The separator can comprise a heat reflective glass. In embodiments where the temperature control component is inbuilt into the separator, only part of the separator can be transparent. Having a transparent part can be useful, so that delivery recipients have a line of sight to the consumable items stored in the bottom section. The customer can remove the heated consumable item from the top section, and then immediately see below into the bottom section where cooled or temperature neutral consumable items are stored. The separator can also have a visual notice such as an arrow or a sign that would direct the delivery recipient's attention towards the bottom section of the item compartment. Since the customer would preferably lift the separator to access the bottom section, it can be important to ensure that they are aware of it.

In some embodiments, the item compartment can further comprise at least one insulation layer configured to be placed between the item compartment and the body. That is, the insulation layer can line the "outside" of the item compartment, but still be "inside" the robot. In embodiments where the item compartment can be removably attached to the body of the robot, the insulation can be simply fixed on the outside of the item compartment. In embodiments where the item compartment is integrated into the body of the robot, the insulation can be placed between the sidewalls of the compartment and the robot and/or on the inside of the item compartment. This is particularly advantageous to minimize the influence of external temperature on the consumable items in the item compartment.

In some embodiments, the top section can comprise a larger circumference than the lower section. That is, the item compartment can comprise two separate parts of different circumference attached together, or an integral part with a smaller circumference at the bottom than at the top. This can be particularly advantageous, since the top section can fit consumable items with a larger circumference such as pizzas, while the bottom section can still fit beverages, salads, side dishes or other cooled or temperature neutral consumable items. Furthermore, a reduced circumference of the bottom section results in reduced heat exchange between the sections. Even further, both the top and bottom section can be insulated more effectively on their own due to the geometry of the resulting item compartment. Also advantageously, the separator can be removably fixed on the bottom of the top section and be supported by the parts of the top section protruding beyond the bottom section. The top and bottom section can preferably still comprise the same center, so that the protruding parts of the top section can be equally spread out around the bottom section.

In some such embodiments, the bottom section can comprise a larger insulation layer than the top section. This embodiment is optional, since ideally both sections can be equally well insulated. However, due to the smaller circumference of the bottom section, more insulation can fit around its sidewalls while still resulting in the same total length and width as the top section. One advantage that can be gained from this is that the bottom section can be insulated well enough to need only passive cooling or no cooling at all. That is, in some embodiments, the temperature control component can provide only heating to the top section, while the extra insulation layer can provide sufficient temperature control for the bottom section.

In some embodiments, the temperature control component can comprise a passive temperature control component. That is, the temperature control component can comprise a hot and/or cold pack that is placed in the top section and/or respectively in the bottom section. In some such embodiments, the temperature control component can comprise at least one of at least one of heating and cooling pad and at least one thermal ballast. The temperature control component can also comprise a chemical cooling and/or warming pack. This can reduce the amount of energy needed to maintain the temperature in the top and bottom sections.

In some embodiments, the temperature control component can comprise an active temperature control component. That is, the temperature control component can require an energy source (which can be independent and/or the same as the robot's power source) to function. The use of an active heating and/or cooling device can ensure a more controlled and stable temperature control. In some such embodiments, the temperature control component can comprise a Peltier element. The Peltier element can be particularly advantageous for the present invention, since it can be inbuilt into the separator in such a way that its hot side faces the top section, and its cold side faces the bottom section. In this way, both heating and cooling can be achieved efficiently with a single temperature control component. The Peltier element can also comprise an aperture or a hole so that the bottom section of the item compartment can be seen through it.

In some such embodiments, the heating hot side of the Peltier element can face the top section and the cooling cold side of the Peltier element can face the bottom section. As mentioned above, this can allow for an efficient temperature control component that does both heating and cooling. Furthermore, the placement of the Peltier element at the bottom of the top section and at the top of the bottom section can allow for efficient heat circulation within the respective compartments.

In some embodiments, the mobile robot can further comprise a lid. The lid can be placed on top of the top section in such a way that it covers it and prevents unauthorized access to the consumable items. In some such embodiments, the lid can comprise a lid insulation layer placed between the lid and the item compartment. That is, this insulation layer can be fixed to the inside surface of the lid and serve to increase the overall insulation of the item compartment and of the top section particularly.

In some embodiments, the top section can comprise a larger horizontal cross-section than the bottom section. The advantages of such a configuration are also described above for an embodiment with different circumferences of the two sections. The change in cross-sections can be smooth or abrupt. In some such embodiments, the item compartment can comprise a tapered shape with the top section comprising a larger horizontal cross-section than the bottom section. That is, the item compartment can decrease in cross-section in a smooth manner (as opposed to a sudden change in cross-section at the junction of the top and bottom sections).

In some embodiments, the item compartment can comprise a cross-section decreasing from the top section towards the bottom section.

In some embodiments with the top section comprising a larger horizontal cross-section than the bottom section, the maximum substantially horizontal cross-section of the item compartment can be at least a fourth larger than the minimum substantially horizontal cross-section of the item compartment. In some other embodiments, the ratio of the top section cross-section to bottom section cross-section comprises at least 6:5, such as at least 5:4, preferably at least 4:3. Such cross-section ratios can ensure sufficient decrease in heat exchange between the sections while also allowing the bottom section to comprise a sufficiently large cross-section.

In some embodiments, the temperature difference between the top section and the bottom section can comprise at least 10° C., preferably at least 20° C., such as at least 30° C.

In some embodiments, the temperature control component can be configured to ensure that the temperature of the at least one heated consumable item does not decrease by more than 15° C., preferably 10° C., even more preferably 5° C. when held in the top section of the item compartment. The temperature decrease is preferably counted between the time the heated item is placed into the top section and the time that it is delivered to the delivery recipient.

In some embodiments, the temperature control component can be configured to ensure that the temperature of the at least one of cooled consumable item or at least one temperature neutral consumable item does not increase by more than 15° C., preferably 10° C., even more preferably 5° C. when held in the bottom section of the item compartment. As above, the increase is preferably measured between the time that the cooled or temperature neutral consumable item is placed into the bottom section and that it is delivered to the delivery recipient.

In some embodiments, the item compartment can comprise a removable compartment, preferably a basket that is configured to fit into the body of the mobile robot. This can be advantageous for quickly replacing the item compartment in the robot with a new one. Furthermore, in cases where the robot is used for deliveries other than heated and cooled consumable items, the item compartment can be replaced with a different version of it that is not specifically optimized for temperature-sensitive items.

In some such embodiments, the item compartment can be configured to be removably attached to the mobile robot at the level of the top section. In some such embodiments, the item compartment can be configured to be attached to the mobile robot via at least one of a snap fit lock, a bayonet lock, a solenoid lock and/or an electronic lock. The lock can be then opened by authorized individuals, but not by delivery recipients.

In some embodiments, the robot can further comprise at least one sensor configured to detect the presence of the consumable items in at least one of the top section and the bottom section. The sensor can comprise at least one or a combination of a visual camera, a thermographic camera, a weight sensor, a capacitive sensor, and an infrared sensor. The sensor can be placed in the item compartment, under it and/or under the lid. The sensor can comprise a plurality of sensors for a more failsafe detection. The sensor can be used to detect that the delivery recipient removed all of the consumable items, including the ones in the bottom section, which may be partially or totally concealed below the separator. The sensor can also be used to detect that the user did not place any items inside the item space. Furthermore, in the case of a camera, the sensor can also detect any tampering with the item space by the delivery recipient.

In some embodiments, the mobile robot can be further configured to grant access to the item space to delivery recipients. That is, the item compartment can be accessed by an authorized delivery recipient. For example, this can be done via a delivery recipients personal computing device as an interface, where the delivery recipient would request the mobile robot to unlock once it arrives to the delivery location.

In some such embodiments, the mobile robot can be configured to generate an alert upon detecting any consumable items remaining in the item space after granting access to the items space to delivery recipients. That is, the mobile robot can arrive to the delivery location and grant access to the item compartment. The delivery recipient can then remove the consumable items from the item compartment. If the delivery recipient forgot to remove any items (for example, from the bottom section), the robot can detect this by using the sensor, and communicate this to the delivery recipient. The communication can be done directly by the robot (for example, by generating a sound, flashing a light, using a speaker on the robot by a remote operator to alert the delivery recipient or by similar means). The communication can also be done by using an interface that the delivery recipient uses to communicate with the robot, for example, a personal computing device such as a smartphone, a tablet, a wearable and/or a similar device.

In a second embodiment, the invention discloses a method for delivering consumable items to delivery recipients using a mobile robot. The method comprises providing the mobile robot comprising a body comprising an item compartment. The method also comprises placing a heated consumable item into a top section of the item compartment. The method further comprises placing at least one of a cooled consumable item and a temperature neutral consumable item into a bottom section of the item compartment. The method also comprises placing a separator between the top section and the bottom section. The method further comprises placing a heated consumable item into a top section of the item compartment. The method also comprises the mobile robot travelling to a delivery location. The method further comprises, while traveling, using a temperature control component to maintain at least one of a temperature exceeding ambient temperature in the top section and a temperature below that of the top section in the bottom section.

The steps of placing consumable items and the separator into the item compartment can be performed at a first location such a hub, a restaurant, a store or a similar location.

In some embodiments, the temperature control component can be an active temperature control component and the method can further comprise actively controlling the temperature in at least one of the top section and the bottom section while travelling to the delivery location. In some such embodiments, the temperature control component can comprise a Peltier element.

In some embodiments, the method can further comprise notifying a delivery recipient that the separator should be removed to access the bottom section. In some such embodiments, the notifying can comprise sending a communication to a delivery recipient's personal computing device. In other embodiments, the notifying can comprise placing a sign on the side of the separator facing the top section.

In some embodiments, the method can further comprise the mobile robot granting access to the consumable items after arriving to the delivery location.

In some embodiments, the method can further comprise ceasing to actively control the temperature in at least one of the top section and the bottom section after delivering the consumable items. This can be particularly advantageous, since it allows to save energy by not actively heating/cooling the section on the way back from the delivery location. In some such embodiments, the method can further comprise detecting that the consumable items have been removed before stopping active temperature control.

In some embodiments, the method can further comprise notifying the delivery recipient after detecting that some consumable items remain in the item compartment. The detecting can be done by using a sensor as described above.

The present invention is also defined by the following numbered embodiments.

Below is a list of device embodiments. Those will be indicated with a letter "A". Whenever such embodiments are referred to, this will be done by referring to "A" embodiments.

A1. A mobile robot (1) configured for delivering consumable items (100) to delivery recipients, the mobile robot comprising
  a body (2) comprising an item compartment (10);
  wherein the item compartment (10) comprises
  a top section (102) configured to hold at least one heated consumable item (1002);
  a bottom section (104) configured to hold at least one of
  at least one cooled consumable item (1004); and
  at least one temperature neutral consumable item (1006);
  a separator (120) configured to separate the top section (102) and the bottom section (104);
  at least one temperature control component (110) configured to maintain at least one of
  a temperature exceeding ambient temperature in the top section (102); and
  a temperature below that of the top section in the bottom section (104).

A2. The mobile robot (1) according to the preceding embodiment wherein the separator (120) comprises the temperature control component (110).

A3. The mobile robot (1) according to any of the preceding embodiments wherein the separator (120) comprises a heat reflective material.

A4. The mobile robot (1) according to any of the preceding embodiments wherein at least part of the separator (120) is transparent.

A5. The mobile robot (1) according to any of the preceding embodiments wherein the item compartment (10) further comprises at least one insulation layer (130) configured to be placed between the item compartment (10) and the body (2).

A6. The mobile robot (1) according to any of the preceding embodiments wherein the top section (102) comprises a larger circumference than the lower section (104).

A7. The mobile robot (1) according to the preceding embodiment and with features of embodiment A5 wherein the bottom section (104) comprises a larger insulation layer (130) than the top section (102).

A8. The mobile robot (1) according to any of the preceding embodiments wherein the temperature control component (110) comprises a passive temperature control component (112).

A9. The mobile robot (1) according to the preceding embodiment wherein the temperature control component (110) comprises at least one of
  at least one of heating and cooling pad (112); and
  at least one thermal ballast (112).

A10. The mobile robot (1) according to any of the preceding embodiments wherein the temperature control component (110) comprises an active temperature control component (114).

A11. The mobile robot (1) according to the preceding embodiment wherein the temperature control component comprises a Peltier element (114).

A12. The mobile robot (1) according to the preceding embodiment with features of embodiment A2 wherein the hot side of the Peltier element (110) faces the top section (102) and the cold side of the Peltier element (110) faces the bottom section (104).

A13. The mobile robot (1) according to any of the preceding embodiments further comprising a lid (6).

A14. The mobile robot (1) according to the preceding embodiment wherein the lid (6) comprises a lid insulation layer (132) placed between the lid (6) and the item compartment (10).

A15. The mobile robot (1) according to any of the preceding embodiments wherein the top section (102) comprises a larger horizontal cross-section than the bottom section (104).

A16. The mobile robot (1) according to the preceding embodiment wherein the item compartment (10) comprises a tapered shape with the top section (102) comprising a larger horizontal cross-section than the bottom section (104).

A17. The mobile robot (1) according to any of the preceding embodiments and with the features of embodiment A15 wherein the item compartment (10) comprises a cross-section decreasing from the top section (102) towards the bottom section (104).

A18. The mobile robot (1) according to any of the preceding three embodiments wherein the maximum substantially horizontal cross-section of the item compartment (10) is at least a fourth larger than the minimum substantially horizontal cross-section of the item compartment (10).

A19. The mobile robot (1) according to any of the preceding embodiments A15 to A17 wherein the ratio of the top section (102) cross-section to bottom section (104) cross-section comprises at least 6:5, such as at least 5:4, preferably at least 4:3.

A20. The mobile robot (1) according to any of the preceding embodiments wherein the temperature difference between the top section (102) and the bottom section (104) comprises at least 10° C., preferably at least 20° C., such as at least 30° C.

A21. The mobile robot (1) according to any of the preceding embodiments wherein the temperature control component (110) is configured to ensure that the temperature of the at least one heated consumable item (1002) does not decrease by more than 15° C., preferably 10° C., even more preferably 5° C. when held in the top section (102) of the item compartment (10).

A22. The mobile robot (1) according to any of the preceding embodiments wherein the temperature control component (110) is configured to ensure that the temperature of the at least one of cooled consumable item (1004) or at least one temperature neutral consumable item (1006) does not increase by more than 15° C., preferably 10° C., even more preferably 5° C. when held in the bottom section (102) of the item compartment (10).

A23. The mobile robot (1) according to any of the preceding embodiments wherein the item compartment (10) comprises a removable compartment, preferably a basket (10) that is configured to fit into the body (2) of the mobile robot (1).

A24. The mobile robot (1) according to the preceding embodiment wherein the item compartment (10) is configured to be removably attached to the mobile robot (1) at the level of the top section (102).

A25. The mobile robot (1) according to any of the two preceding embodiments wherein the item compartment (10) is configured to be attached to the mobile robot (1) via at least one of a snap fit lock, a bayonet lock, a solenoid lock and/or an electronic lock.

A26. The mobile robot (1) according to any of the preceding embodiments further comprising at least one sensor (140) configured to detect the presence of the consumable items (1000) in at least one of the top section (104) and the bottom section (102).

A27. The mobile robot (1) according to the preceding embodiment wherein the sensor (140) comprises at least one or a combination of a
visual camera;
thermographic camera;
weight sensor;
capacitive sensor; and
infrared sensor.

A28. The mobile robot (1) according to any of the preceding embodiments further configured to grant access to the item space (10) to delivery recipients.

A29. The mobile robot (1) according to the preceding embodiment and with the features of embodiment A26 configured to generate an alert upon detecting any consumable items (1000) remaining in the item space (10) after granting access to the items space (10) to delivery recipients.

Below is a list of method embodiments. Those will be indicated with a letter "M". Whenever such embodiments are referred to, this will be done by referring to "M" embodiments.

M1. A method for delivering consumable items (1000) to delivery recipients using a mobile robot (1), the method comprising providing the mobile robot comprising a body (2) comprising an item compartment (10);
placing at least one of a cooled consumable item (1004) and a temperature neutral consumable item (1006) into a bottom section (104) of the item compartment (10);
placing a separator (12) between the top section (102) and the bottom section (104);
placing a heated consumable item (1002) into a top section (102) of the item compartment (10);
the mobile robot travelling to a delivery location;
while traveling, using a temperature control component (110) to maintain at least one of
a temperature exceeding ambient temperature in the top section (102); and
a temperature below that of the top section in the bottom section (104).

M2. The method of the preceding embodiment wherein the temperature control component (110) is an active temperature control component (110) and wherein the method further comprises actively controlling the temperature in at least one of the top section (102) and the bottom section (104) while travelling to the delivery location.

M3. The method according to the preceding embodiment wherein the temperature control component (110) comprises a Peltier element.

M4. The method according to any of the preceding method embodiments further comprising notifying a delivery recipient that the separator (12) should be removed to access the bottom section (104).

M5. The method according to the preceding embodiment wherein the notifying comprises sending a communication to a delivery recipient's personal computing device.

M6. The method according to any of the preceding method embodiments and with the features of embodiment M4 wherein the notifying comprises placing a sign on the side of the separator (12) facing the top section (102).

M7. The method according to any of the preceding method embodiments further comprising the mobile robot granting access to the consumable items (1000) after arriving to the delivery location.

M8. The method according to any of the preceding method embodiments and with the features of embodiment M2 further comprising ceasing to actively control the temperature in at least one of the top section (102) and the bottom section (104) after delivering the consumable items (1000).

M9. The method according to the preceding embodiment further comprising detecting that the consumable items (1000) have been removed before stopping active temperature control.

M10. The method according to any of the preceding method embodiments further comprising notifying the delivery recipient after detecting that some consumable items (1000) remain in the item compartment (10).

The present technology will now be discussed with reference to the accompanying drawings.

DESCRIPTION OF EMBODIMENTS

Figure 1:
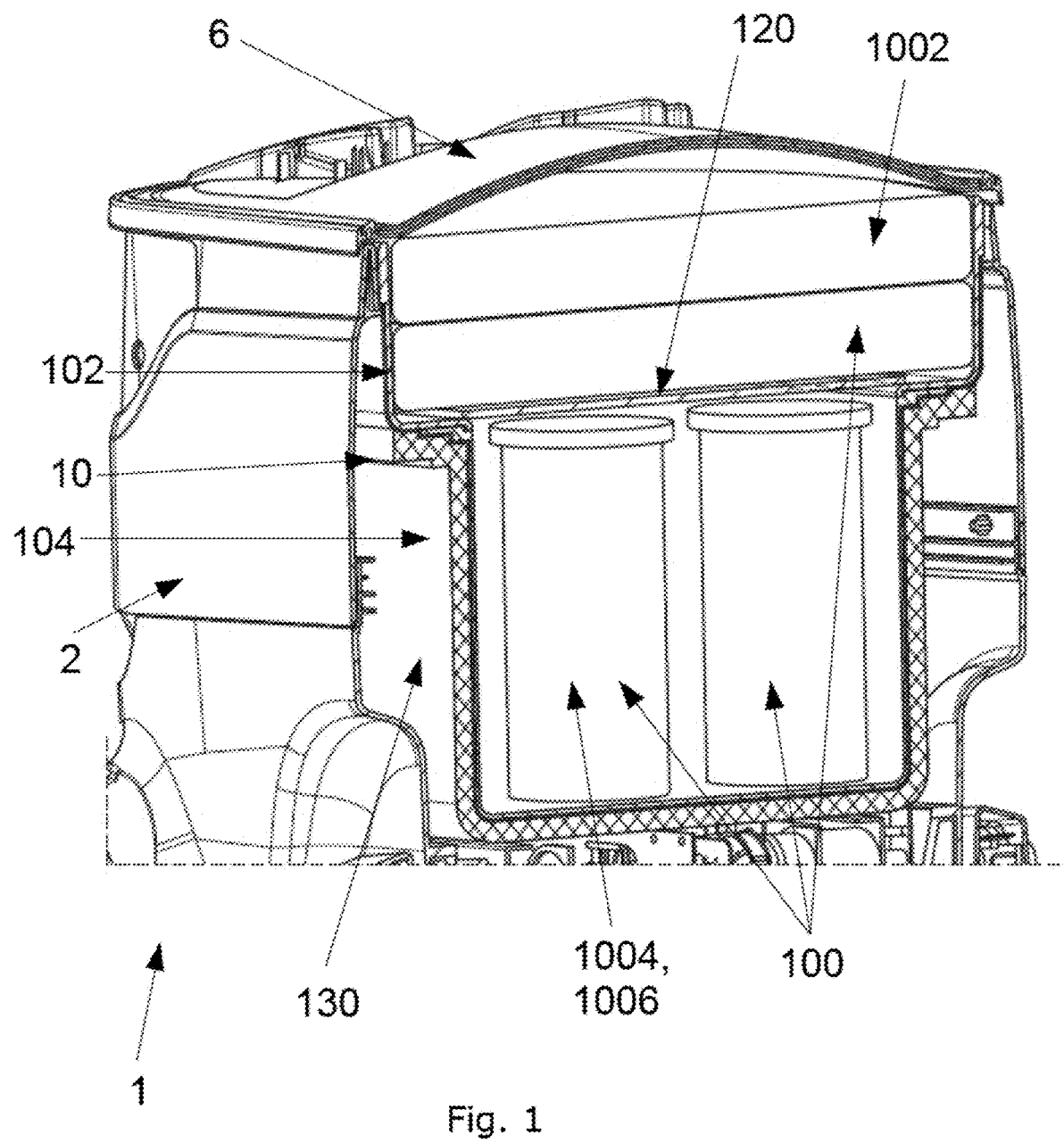
FIG. 1 depicts a partial embodiment of a mobile robot 1 including an item compartment 10 according to one aspect of the invention.
Figure 6:
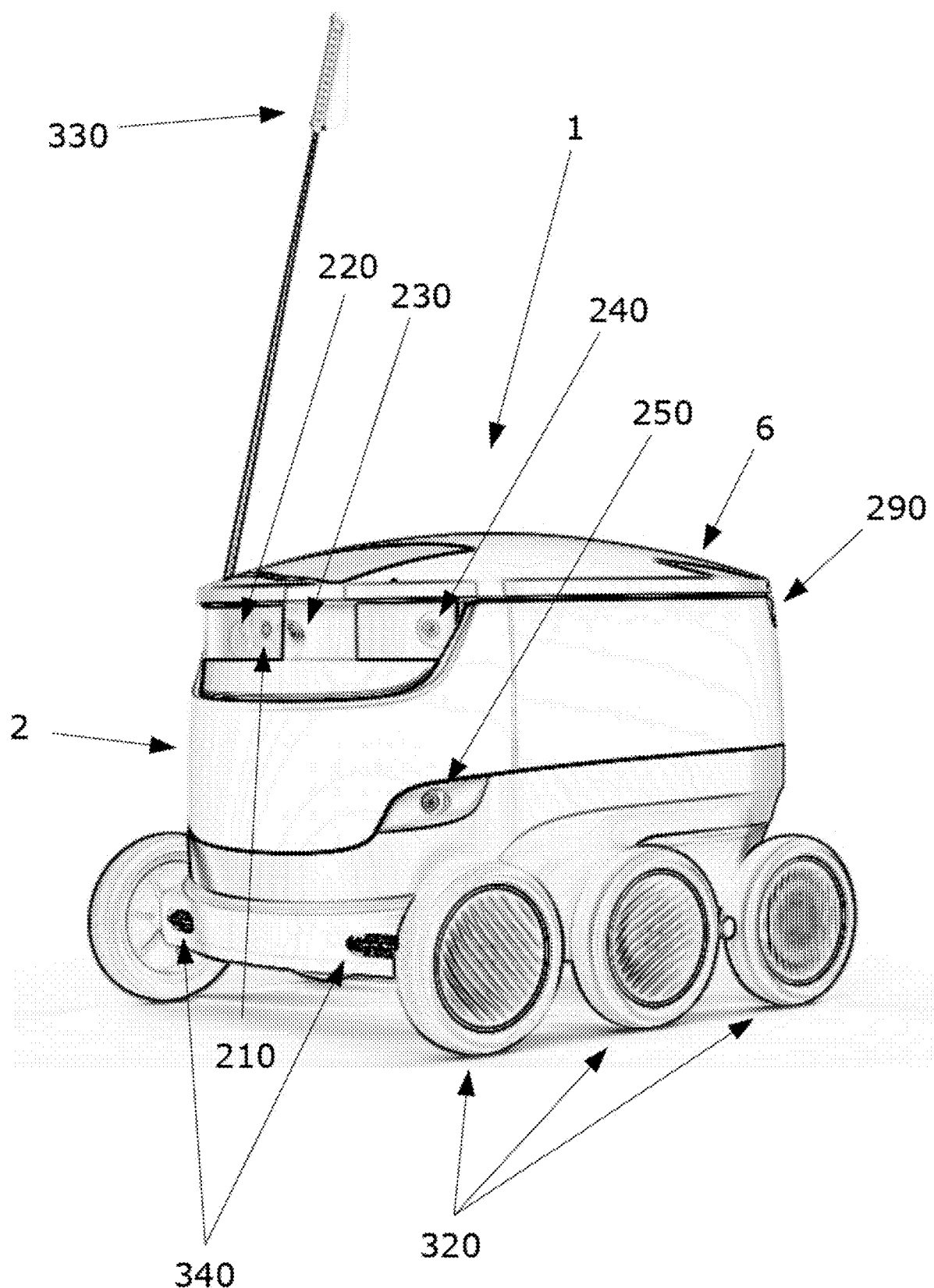
FIG. 6 depicts an exemplary embodiment of the mobile robot 1 according to one aspect of the invention.

FIG. 1 schematically depicts an embodiment of a mobile robot 1 configured to carry consumable items. The FIG. depicts a part of the mobile robot 1 and not all of it. FIG. 6 depicts a schematic embodiment of the mobile robot 1 shown entirely. The mobile robot 1 comprises a body 2. The body 2 as depicted in the image comprises a preferably plastic material enveloping an interior cavity. Item compartment 10 can be placed in this cavity, so as to be enveloped and concealed by the body 2. The item compartment 10 is shown as a removable compartment 10 depicted as a basket 10. However, the item compartment 10 can also be an integral part of the mobile robot 1 and not be removable. The item compartment is configured to carry consumable items 100. Note, that consumable items can comprise food and beverages such as takeout, meals, warm and cold food and drinks. The robot 1 also comprises a lid 6, which covers the top of the item compartment 10. The lid 6 can also comprise a lock, such as an electronic lock, to prevent unauthorized access to the item compartment 10.

The item compartment 10 comprises a top section 102. The top section 102 is configured to carry heated consumable items 1002. The top section 102 can be particularly configured to carry pizzas and items of a similar shape. Preferably, at least two pizzas can fit into the top section 102. More preferably, three pizzas can fit into the top section 102. The top section 102 also comprises an insulation layer 130 placed around the item compartment 10. The insulation layer 130 may not be placed all around the item compartment 10. Some of the insulation layer may also be placed under the lid 6 of the robot 1.

The item compartment 10 also comprises a bottom section 104. The bottom section 104 is configured to carry cooled or temperature neutral consumable items 1004, 1006. Cooled consumable items 1004 can comprise salads, desserts (such as ice cream) and drinks such as soft drinks, smoothies, juices or alcoholic beverages. Temperature neutral items 1006 can comprise side dishes such as bread or beverages such as red wine. The bottom section 104 also comprises the insulation layer 130 placed around the item compartment 10.

The top section 102 and the bottom section 104 are separated by a separator 120. The separator 120 can comprise a pane that completely separates the insides of the top and bottom sections. For example, the separator 120 can comprise a glass pane or a plastic pane. The separator 120 can also comprise a heat reflective glass or plastic in order to increase the isolation between the top and bottom sections 102, 104. The separator 120 can be transparent, so that a user opening the robot's lid and removing heated items 1002 from the top section 102 can see below into the bottom section 104 where further consumable items 100 can be located. However, the separator 120 need not be transparent and can just comprise an indicator such as a sticker directing the user to lift it. The separator 120 can comprise a mechanical or an electronic lock allowing the user to unlock it and lift it so as to gain access into the bottom section 104 of the item compartment 10.

The top section 102 and the bottom section 104 preferably comprise different horizontal cross-sections. That is, the top section 102 is depicted as being wider and longer than the bottom section 104. There are multiple advantages to this shape. The larger horizontal cross-section of the top section 102 allows it to better fit heated consumable items 1002 such as pizzas. The smaller cross-section of the bottom section 104 results in less heat exchange between the two sections through the separator 120. Furthermore, the resulting additional space between the bottom section 104 and the inside surface of the robot's body 2 allows for a thicker insulation layer to be placed around the bottom section 104.

The bottom section 104 can comprise a larger height that the top section 102. This is again optimal, as heated items such as pizzas and items of a similar shape are generally flatter than cooled items such as beverages or salads.

Figure 2:
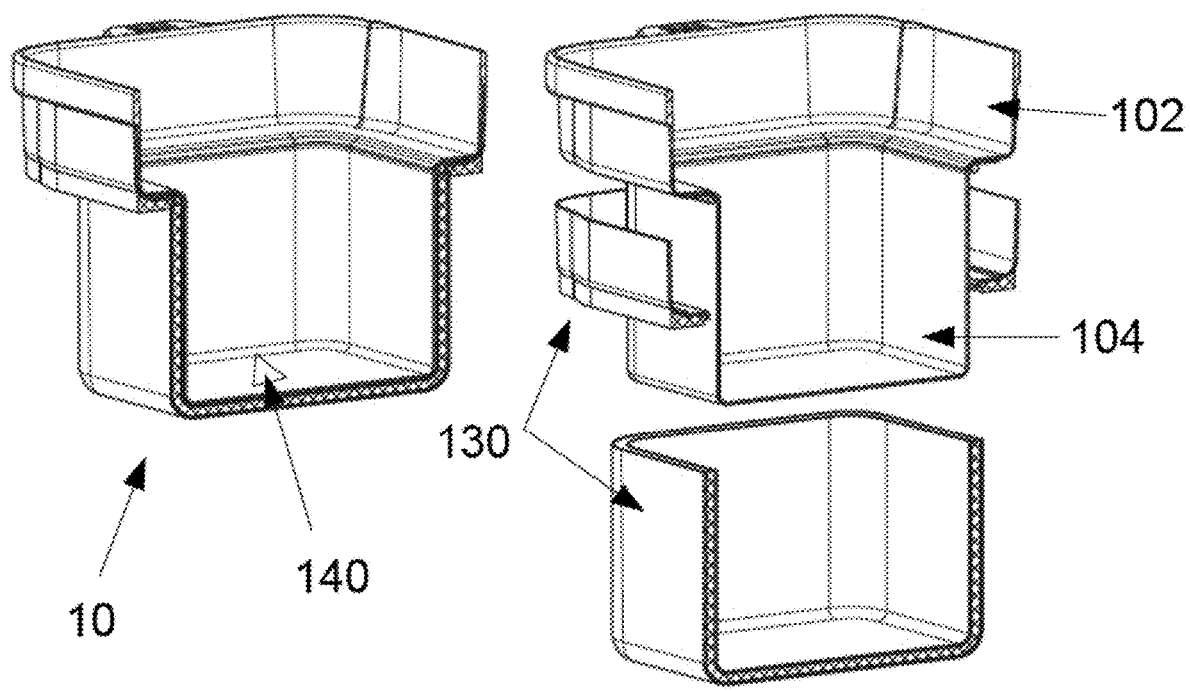
FIGS. 2 and 3 depict embodiments of the item compartment 10 according to one aspect of the invention.

FIG. 2 depicts the item compartment 10 separate from the mobile robot 1. The insulation layer 130 is shown separately and the different horizontal and vertical cross-sections of the top and bottom sections 102, 104 are clearly visible. The item compartment 10 can be manufactured as one piece, or assembled from two separate pieces for the top and bottom sections 102, 104.

FIG. 2 also depicts a sensor 140. The sensor 140 can be configured to detect the presence of consumable items 1000 (or any type of items) in the item compartment 10. The sensor 140 can comprise a visual camera, a thermographic camera, a weight sensor, a capacitive sensor, an infrared sensor and/or a plurality of these sensors. The sensor 140 is shown at the bottom of the bottom section 102 of the item compartment 10, but this is optional. The sensor 140 can also be located at the inside surface of the robot's lid, in the top section 104, in the separator 12 and/or in a plurality of places.

Figure 3:
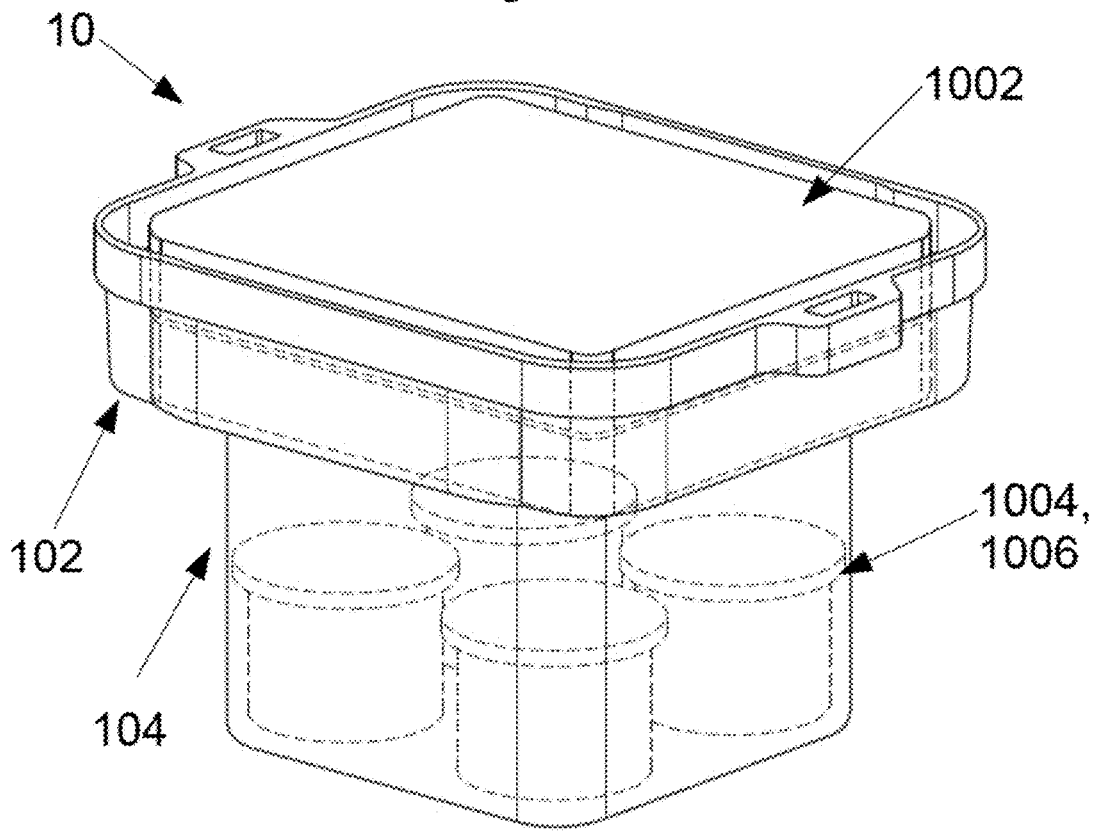

FIG. 3 also depicts the item compartment 10 without the mobile robot 1. Further heated items 1002 are shown in the top section 102. As before, the heated items 1002 preferably comprise a relatively large length and width and a relatively small height such as pizza boxes. The cooled and temperature neutral items 1004, 1006 are shown in the bottom section of the item compartment 10. Those can comprise beverages, salads or other items that generally comprise a larger height than pizza boxes.

Figure 4:
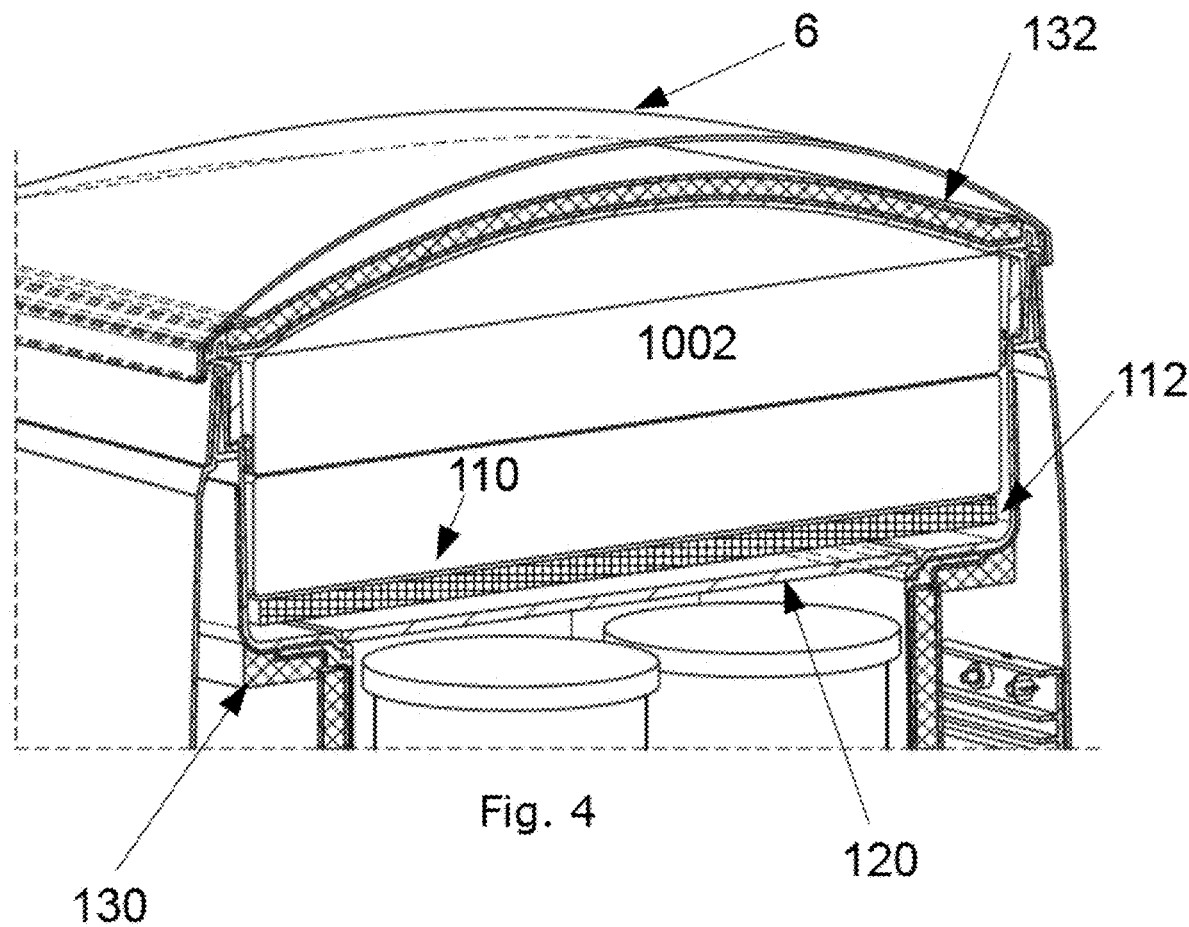
FIGS. 4 and 5 depicts modified embodiments of the item compartment according to one aspect of the invention.
Figure 5:
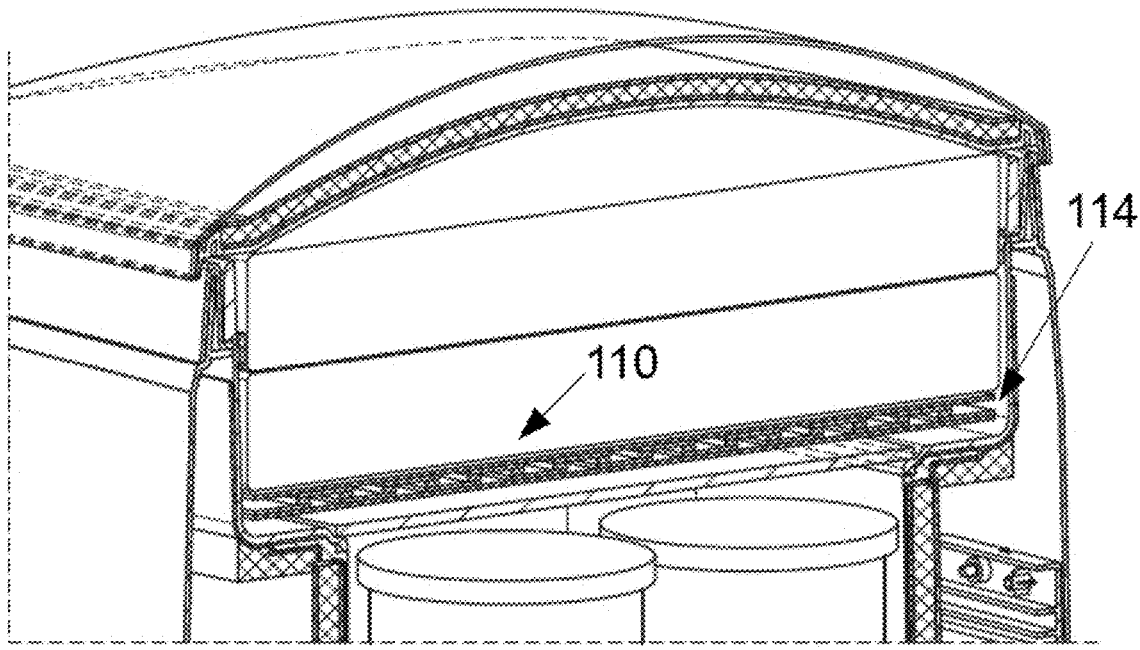

FIGS. 4 and 5 depict another preferred embodiment of the mobile robot 1 comprising the item compartment 10. The insulation layer 130 is shown in both figures. Further, a lid insulation layer 132 is shown as well. In both figures, the item compartment 10 comprises a temperature control component 110. However, FIG. 4 schematically depicts a passive temperature control component 112, and FIG. 5 schematically depicts an active temperature control component 114.

The passive temperature control component 112 depicted in FIG. 4 can comprise heating and cooling pads or a thermal ballast. The passive temperature control component 112 is depicted only in the top section 102 in FIG. 4, but a similar component can also be placed in the bottom section 104 (that would respectably be a cooling pad or a cold thermal ballast). The passive temperature control component 112 is advantageously placed below the heated items 1002, so that the rising heat maximally limits their heat loss. The separator 120 can serve to also insulate the bottom section 104 from the heat generated by the passive temperature control component 112. The passive temperature control component 112 can also comprise an opening or a window, so that the user can see through it (and through the preferably transparent separator 120) into the bottom section 104 of the item compartment 10. The opening or window can serve to further insulate the bottom section 104, since most or all of the passive temperature control component 112 can be located above the part of the top section 102 protruding above and to the side of the bottom section 104, below which the insulation layer 130 would further prevent heat exchange.

A chemical temperature control component 112 based, for example, on zeolite can also be used to simultaneously release heat into the top section 102 and absorb it from the bottom section 104.

The active temperature control component 114 depicted in FIG. 5 can comprise a Peltier element or a different electrical heating/cooling element. A Peltier element can be particularly advantageous, since it would allow the active temperature control component 114 to simultaneously provide heating to the top section 102 and cooling to the bottom section 104. By applying a voltage across the Peltier element, a temperature difference can be generated between its two sides, thereby allowing to use one of them for heating and the other for cooling. The placing of the Peltier element at the bottom of the top section 102 and on top of the bottom section 104 (thereby bridging between the two sections) is also particularly advantageous, since the emitted heat will rise to the top of the top section 102 (thereby heating the heated consumable items 1002) and the heat accumulating in the bottom section 104 can be efficiently extracted from its top (thereby ensuring that a cooler air circulated around the cooled or temperature neutral items 1004, 1006). The active temperature control component 114 comprising the Peltier element can either be inbuilt into the separator 120 or comprise the separator 120. The Peltier element can also comprise an opening or window so that the bottom section 104 can be seen when opening the lid 6 of the robot 1. In this case, the opening or window can be covered by a transparent glass or plastic pane to minimize heat transfer between the two sections.

FIG. 6 demonstrates an exemplary embodiment of the mobile robot 1 configured to deliver consumable items 100 to customers. The mobile robot 1 comprises a body 2. The body 2 comprises the item compartment in which consumable items can be transported (not shown in the present figure).

The mobile robot 1 further comprises a motion component 320 (depicted as wheels 320). In the present embodiment, the motion component 320 comprises six wheels 320. This can be particularly advantageous for the mobile robot 1 when traversing curbstones or other similar obstacles on the way to delivery recipients.

The mobile robot 1 further comprises a flagpole or stick 330 used to increase the visibility of the robot. Particularly, the visibility of the robot during road crossings can be increased. In some embodiments, the flagpole 330 can comprise an antenna. The mobile robot 1 further comprises robot headlights 340 configured to facilitate the robot's navigation in reduced natural light scenarios and/or increase the robot's visibility further. The headlights are schematically depicted as two symmetric lights 340, but can comprise one light, a plurality of lights arranges differently and other similar arrangements.

The mobile robot 1 also comprises sensors 210, 220, 230, 240, 250, and 290. The sensors are depicted as visual cameras in the FIG., but can also comprise radar sensors, ultrasonic sensors, Lidar sensors, time of flight cameras and/or other sensors. Further sensors can also be present on the mobile robot 1. One sensor can comprise a front camera 210. The front camera 210 can be generally forward facing. The sensors may also comprise front, side and/or back stereo cameras 220, 230, 240, 250, 290. The front stereo cameras 220 and 230 can be slightly downward facing. The side stereo cameras 240 and 250 can be forward-sideways facing. There can be analogous side stereo cameras on the other side of the robot (not shown in the FIG.). The back stereo camera 290 can be generally backward facing. The sensors present on multiple sides of the robot can contribute to its situational awareness. That is, the robot 1 can be configured to detect approaching objects and/or hazardous moving objects from a plurality of sides and act accordingly.

The sensors can also allow the robot to navigate and travel to its destinations at least partially autonomously. That is, the robot can be configured to map its surroundings, localize itself on such a map and navigate towards different destinations using in part the input received from the multiple sensors.

Figure 7:
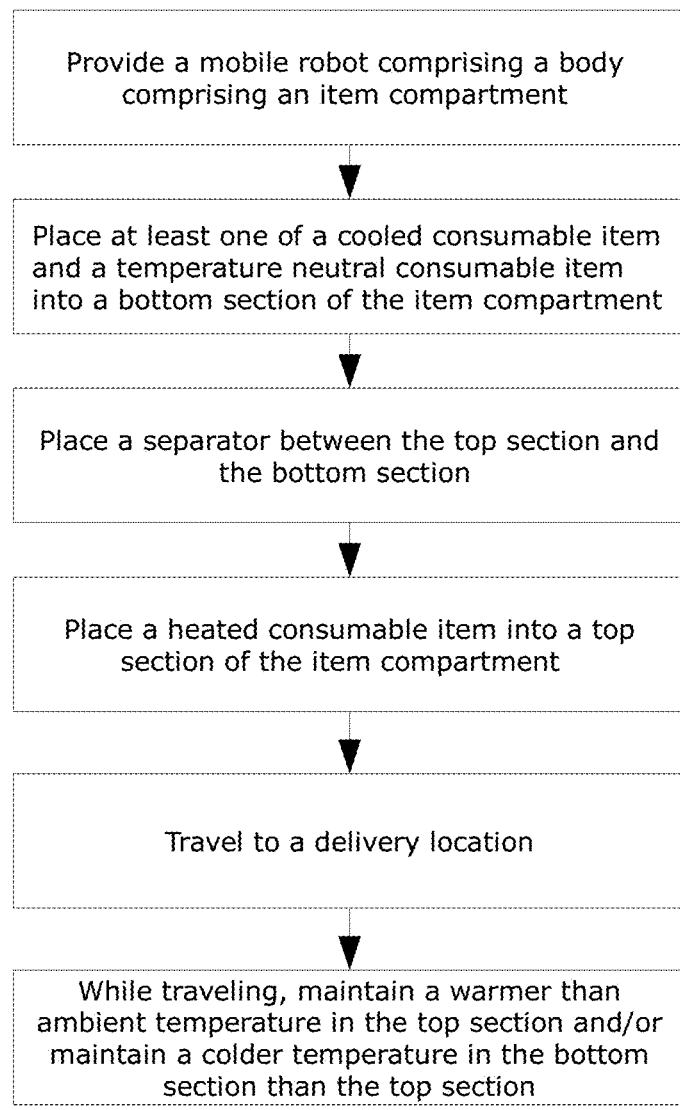
FIG. 7 schematically depicts a method of using the mobile robot 1 for delivering consumable items.

FIG. 7 depicts a method of using the mobile robot 1 for delivering consumable items 1000. In a first step, a mobile robot comprising a body with an item compartment is provided. In a second step, cooled or temperature neutral consumable items are placed into the bottom section of the item compartment. In a third step, a separator is placed between the top section and the bottom section. In a fourth step, a heated consumable item is placed into a top section of the item compartment. The separator can serve as the "floor" of the top section. In a fifth step the robot can travel to a delivery location. While traveling, as a sixth step, the mobile robot can maintain a temperature warmer than the ambient temperature in the top section and/or a temperature that is colder than that of the top section in the bottom section. The temperature maintained in the top section can be relatively close to the temperature of the heated consumable item in it. For example, it can be a temperature exceeding 40° C. The temperature of the bottom section can be colder or warmer than the ambient temperature (depending on the season and/or weather). However, it would be colder than that of the top section. For example, the bottom section can comprise a temperature below 20° C.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

We claim:

1. A mobile robot configured for delivering consumable items to delivery recipients, the mobile robot comprising:
   a body comprising an item compartment, wherein the item compartment comprises:
      a top section configured to hold at least one heated consumable item;
      a bottom section configured to hold at least one of:
         at least one cooled consumable item; and/or
         at least one temperature-neutral consumable item;
      a separator configured to separate the top section and the bottom section;
   at least one temperature control component configured to maintain at least one of:
      a temperature exceeding ambient temperature in the top section; and/or
      a temperature below that of the top section in the bottom section.

2. The mobile robot according to claim 1 wherein the separator comprises the temperature control component.

3. The mobile robot according to claim 1 wherein at least part of the separator is transparent.

4. The mobile robot according to claim 1 wherein the temperature control component comprises a passive temperature control component.

5. The mobile robot according to claim 1 wherein the temperature control component comprises an active temperature control component.

6. The mobile robot according to claim 5 wherein the temperature control component comprises a Peltier element.

7. The mobile robot according to claim 1 wherein the top section comprises a larger horizontal cross-section than the bottom section.

8. The mobile robot according to claim 7 wherein the maximum substantially horizontal cross-section of the item compartment is at least a fourth larger than the minimum substantially horizontal cross-section of the item compartment.

9. The mobile robot according to claim 1 wherein the item compartment comprises a removable compartment.

10. The mobile robot of claim 9, wherein the removable compartment comprises a basket configured to fit into the body of the mobile robot.

11. The mobile robot according to claim 9 further configured to grant access to the item compartment to delivery recipients and wherein the mobile robot is configured to generate an alert upon detecting any consumable items remaining in the item compartment after granting access to the item compartment to delivery recipients.

12. The mobile robot according to claim 1 further comprising at least one sensor configured to detect presence of the consumable items in at least one of the top section and the bottom section and wherein the sensor comprises at least one or a combination of:
   a visual camera;
   a thermographic camera;
   a weight sensor;
   a capacitive sensor; and/or
   an infrared sensor.

13. The mobile robot according to claim 1 wherein a temperature difference between the top section and the bottom section comprises at least 10° C.

14. A method for delivering consumable items to delivery recipients using a mobile robot, the method comprising:
   providing the mobile robot comprising a body comprising an item compartment, wherein the item compartment comprises a top section and a bottom section;
   placing at least one of a cooled consumable item and a temperature-neutral consumable item into the bottom section of the item compartment;
   placing a separator between the top section and the bottom section;
   placing a heated consumable item into the top section of the item compartment;
   the mobile robot travelling to a delivery location; and
   while traveling, using a temperature control component to maintain at least one of:
      a temperature exceeding ambient temperature in the top section; and/or
      a temperature below that of the top section in the bottom section.

15. The method according to claim 14 further comprising notifying a delivery recipient that the separator should be removed to access the bottom section.

16. The method according to claim 14 further comprising the mobile robot granting access to the consumable items after arriving to the delivery location.

17. The method of claim 14 wherein the temperature control component is an active temperature control component and wherein the method further comprises actively controlling the temperature in at least one of the top section and the bottom section while travelling to the delivery location.

18. The method according to claim 17 further comprising ceasing to actively control the temperature in at least one of the top section and the bottom section after delivering the consumable items.

19. The method according to claim 18 further comprising detecting that the consumable items have been removed before stopping active temperature control.

20. The method according to claim 14 further comprising notifying a delivery recipient after detecting that some consumable items remain in the item compartment.

* * * * *